United States Patent Office 2,823,876
Patented Feb. 18, 1958

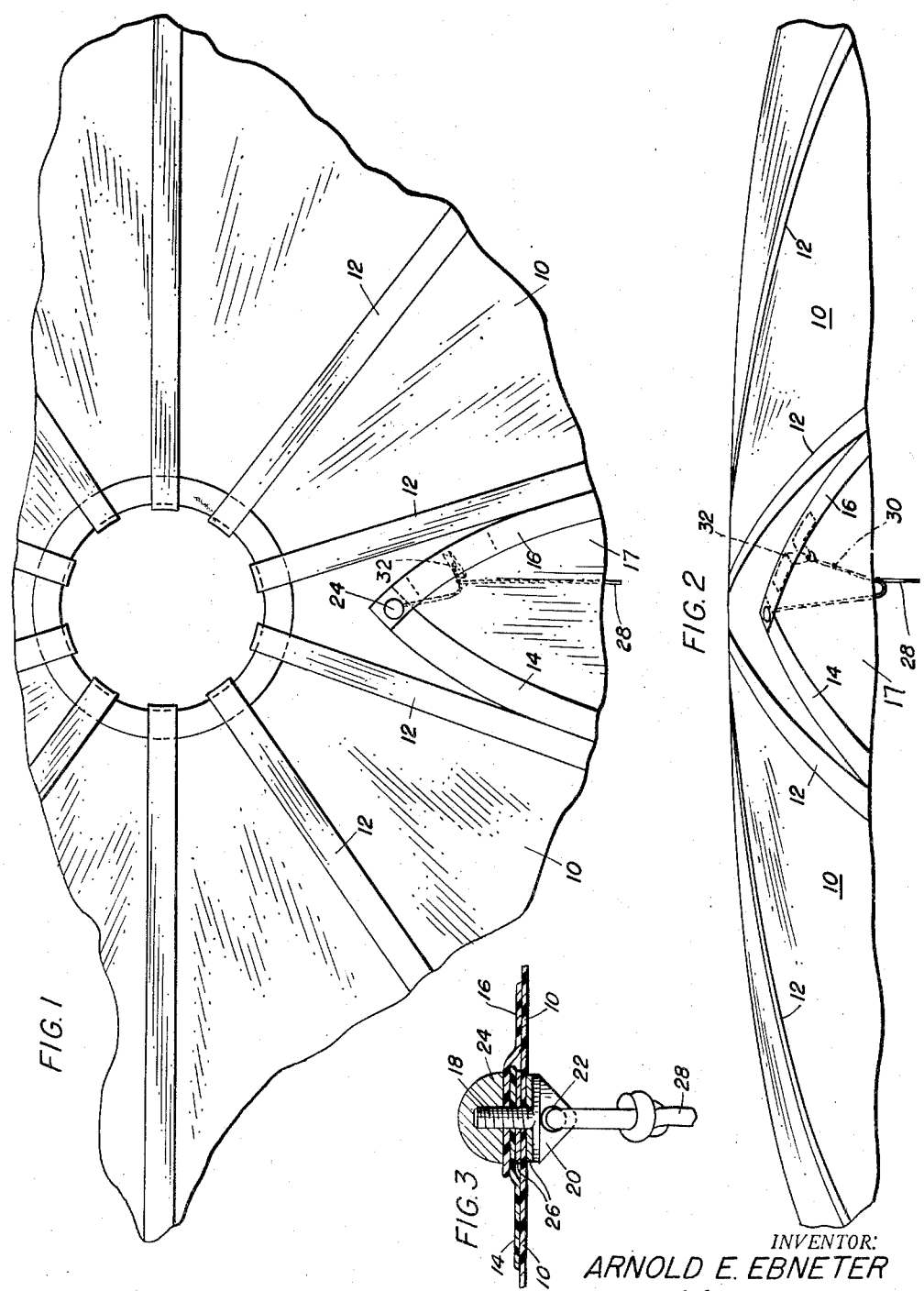

2,823,876

BALLOON RIP PANEL

Arnold E. Ebneter, Victoria, Tex., assignor, by mesne assignments, to the United States of America as represented by the Secretary of the Navy Application March 10, 1955, Serial No. 493,578

7 Claims. (Cl. 244—31)

This invention relates in general to a rip panel for balloons and is more particularly described as a construction of this kind for gored balloons made of polyethylene and the like.

Many balloons of this type are used experimentally and carry instruments for recording temperatures, pressures, and other experimental data included in an operative load suspended from the balloon, so that it is desirable to recover the instruments and data after some predetermined object has been attained. For this reason and other reasons, it is desirable to provide means for deflating the balloon so that the flight may be terminated and the load brought to the ground. This may be accomplished by a deflation valve, but to insure the rapid descent of a balloon at a predetermined location, and sometimes to save the instruments or the load carried, it is desirable to rip at least one of the balloon panels so that the inflation gas may escape rapidly, causing an immediate descent of the balloon and the load attached thereto.

An important object of the invention is to provide a rip panel which may be quickly operated at any desired time by means of a rip panel line extending from the rip panel within the balloon and to an operating mechanism carried by the load at the bottom of the balloon.

A further object of the invention is to provide means for preventing the accidental severance of the rip panel before the intended operation thereof.

A still further object of the invention is to provide a rip panel bolt attached in one of the balloon gores, preferably near the top of the balloon, which is connected to the rip panel line, the bolt being supported by tapes which direct the pattern of tearing of the gore or panel in which the bolt is mounted.

Other objects of the invention will appear in the specification and will be apparent from the accompanying drawings, in which Fig. 1 is a fragmentary top view of a balloon having gores in which the rip panel of this invention is installed;

Fig. 2 is a fragmentary side elevation of a balloon as shown in Fig. 1 further illustrating the position and application of the panel ripping means; and Fig. 3 is an enlarged view, particularly in section, of a rip panel bolt and its connection with the rip panel line and the safety support therefor.

This rip panel installation is particularly described for polyethylene balloon gores which are connected together by taped joints and a similar application may be made to balloons having gores with welded joints by defining the rip area of the gore by means of externally applied tapes in the same manner as in the present invention.

Referring now more particularly to the drawings, a thin plastic balloon has polyethylene or similar gores 10 which are joined at the joints by tapes 12, the gores tapering toward the top and toward the bottom in a well-known manner. Near the top of one of the gores, external tearing tapes 14 and 16 are applied within the confines of the gore boundary tapes 12 and are brought inwardly together at a short distance from the top where one tape overlaps the other. The gore portion engaged by and disposed between the tapes 14 and 16 constitutes the rip panel 17. At the juncture of these rip tapes 14 and 16, a threaded rip line bolt is inserted from the inside of the balloon with a head 20 having a connector ring 22 at the inside of the balloon and a rounded nut 24 engaging a threaded portion 18 at the outside of the balloon. The bolt is inserted directly through the material of the gore 10 and gaskets 26 are preferably placed on opposite sides of the gore and surrounding the threaded portion 18 to prevent undue pressure upon the gore material. The overlapping portions of the tearing tapes 14 and 16 are also provided with perforations through which the threaded part 18 of the bolt extends so that these tearing tapes are tightly held by the bolt. The nut 24 is rounded at its entire outer surface so that no sharp points or edges are provided which would tend to tear the balloon material.

At the inside of the balloon, a rip panel line 28 is connected to the bolt ring 22, and the lower end of this line extends through the bottom of the balloon and to an operating mechanism carried by the balloon load which is not shown but which operates in a well-known manner to pull upon this rip panel line at any desired or predetermined time. This rip panel line would provide a constant pull upon the rip line bolt which might tend to weaken and eventually to form a hole in the associated gore 10 at an undesirable time if this rip panel line were not additionally supported. For this purpose a rip panel safety line 30 is connected near the upper end of the line 28, and this safety line is connected to a tape loop 32 at the inside of the rip panel 17 and preferably opposite one of the tear tapes. With this construction the upper end of the rip panel line 28 is held in a free loop so that no undue pressure is applied to the rip panel bolt during the ordinary operation of the balloon. If it is desirable to positively operate and sever the rip panel 17, a definite pull must be given upon the rip panel line 28 sufficient to break the safety line 30 or to pull it loose with the tape loop 32 by which it is attached.

With this construction a sufficient pull upon the rip panel line will cause the rip panel bolt to be drawn inwardly tearing the material of the balloon gore to which it is attached, and the pattern of the tear is determined by the tapes 14 and 16 which outline the marginal edges of the tear panel 17. Inward force on the rip line must be greater than the strength of the safety line, and the rip panel as defined by the tapes 14 and 16 extends downwardly, usually to the mid-portion of the balloon commonly known as the balloon equator. When one gore of the balloon has been open to this extent, the inflation gas quickly escapes and the balloon falls quickly to the ground.

While a preferred embodiment has been described in some detail, it should be regarded as an example or embodiment of the invention and not as a restriction or limitation therein as many changes may be made in the construction and arrangement of the parts without departing from the spirit and scope of the invention.

I claim:

1. The combination of a balloon having a thin plastic gore of polyethylene or the like, a taped outline secured to the gore between its side seams and extending from a point near the upper end of the gore downward toward said seams, gaskets on opposite faces of the gore at said point, a bolt extending through said gaskets, gore and taped outline and having an eye at the inside of the balloon, a nut having a rounded outer end and cooperating with said bolt to clamp said gaskets, gore and taped outline at said point, and a pull line connected to said eye and extending through the bottom of the balloon and operative to rupture the gore in the pattern of the taped outline.

2. The combination of a balloon envelope of polyethylene or the like film material, a taped outline secured to the outer face of a portion of said envelope, said outline having an apex portion and diverging downward from said apex portion, gaskets on opposite faces of said envelope portion at said apex portion, a bolt extending through said gaskets, envelope portion and apex portion to the inside of said envelope, said envelope portion being imperforate except where said bolt passes therethrough, a nut cooperating with said bolt to clamp said gaskets, envelope portion, and apex portion, and a pull line connected to said bolt within said envelope and extending through the bottom of said envelope, whereby said pull line is operative to pull said outline and said envelope portion inward and rupture said envelope portion from the remainder of said envelope in the pattern of said taped outline.

3. The combination of a balloon envelope of polyethylene or the like material, a taped outline secured to the outer face of a portion of said envelope, said outline having an apex portion and diverging downward from said apex portion, said outline being formed of a pair of tape strips having ends overlapped at said apex portion, gaskets on opposite faces of said envelope portion at said apex portion, a bolt extending through said gaskets, envelope portion, and apex portion to the inside of said envelope, said envelope portion being imperforate except where said bolt passes therethrough, a nut cooperating with said bolt to clamp said gaskets, envelope portion, and apex portion, and a pull line connected to said bolt within said envelope and extending through the bottom of said envelope, whereby said pull line is operative to pull said outline and said envelope portion inward and rupture said envelope portion from the remainder of said envelope in the pattern of the taped outline.

4. The combination of a balloon envelope of polyethylene or the like film material, a taped pattern secured to the outer face of a portion of said envelope, said pattern having an apex portion and diverging downward from said apex portion, means clamping said portions together and including a bolt extending through said envelope and apex portion to the inside of said envelope, said envelope portion being imperforate except where said bolt passes therethrough, and a pull line connected to said bolt within said envelope and extending through the bottom of said envelope, whereby said pull line is operative to pull said pattern and said envelope portion inward and rupture said envelope portion from the remainder of the envelope in the shape defined by the outline of said pattern.

5. The combination of a balloon envelope of polyethylene or the like film material, a taped outline secured to the outer face of a portion of said envelope, said outline having an apex portion and diverging downward from said apex portion, said outline being formed of a pair of tape strips having ends overlapped at said apex portion, gaskets on opposite faces of said envelope portion at said apex portion, means clamping said portions and gaskets together and including a bolt extending through said portions and gaskets to the inside of said envelope, said envelope portion being imperforate except where said bolt passes therethrough, and a pull line connected to said bolt within the envelope and extending through the bottom of said envelope and operative to pull said outline and said envelope portion inward and rupture said envelope portion from the remainder of said envelope in the pattern defined by said outline.

6. The combination of a plastic film balloon envelope having an imperforate portion, tape means secured to the outer face of said envelope and diverging downward and outlining an imperforate portion of said envelope, and a rip line secured to the top of the tape means and extending through said envelope film to the interior of said envelope, whereby said rip line is operative to pull said tape means and said envelope portion inward and rupture said envelope portion from the remainder of said envelope in the pattern defined by said tape means.

7. The structure of claim 6 characterized in that the tape means is adhesively secured to the outer face of the envelope.

References Cited in the file of this patent

UNITED STATES PATENTS

| | | |
|---|---|---|
| 2,577,737 | Brown | Dec. 11, 1951 |
| 2,681,774 | Winzen | June 22, 1954 |

FOREIGN PATENTS

| | | |
|---|---|---|
| 127,633 | Great Britain | June 12, 1919 |
| 385,849 | Germany | Nov. 30, 1923 |